US008644391B2

(12) United States Patent
Lee et al.

(10) Patent No.: US 8,644,391 B2
(45) Date of Patent: Feb. 4, 2014

(54) SPACE EXPLORATION METHOD OF RECONFIGURABLE MOTION COMPENSATION ARCHITECTURE

(75) Inventors: Gwo-Giun Lee, Tainan (TW); Wei-Chiao Yang, Tainan (TW); He-Yuan Lin, Tainan (TW); Min-Shan Wu, Tainan (TW)

(73) Assignee: National Cheng Kung University, Tainan (TW)

( * ) Notice: Subject to any disclaimer, the term of this patent is extended or adjusted under 35 U.S.C. 154(b) by 447 days.

(21) Appl. No.: 13/106,039

(22) Filed: May 12, 2011

(65) Prior Publication Data
US 2012/0288000 A1    Nov. 15, 2012

(51) Int. Cl.
*H04N 7/12* (2006.01)
(52) U.S. Cl.
USPC .................................................. 375/240.16
(58) Field of Classification Search
USPC ........................................ 375/240.01, 240.16
See application file for complete search history.

(56) References Cited

U.S. PATENT DOCUMENTS

| | | | |
|---|---|---|---|
| 7,000,193 B1 * | 2/2006 | Impink et al. | 715/771 |
| 2009/0240607 A1 * | 9/2009 | Shortridge | 705/30 |
| 2011/0004885 A1 * | 1/2011 | Kikuchi et al. | 718/104 |

* cited by examiner

*Primary Examiner* — Dave Czekaj
*Assistant Examiner* — Tracy Li
(74) *Attorney, Agent, or Firm* — Bacon & Thomas, PLLC

(57) ABSTRACT

A design space exploration method of a reconfigurable motion compensation architecture is disclosed. The method comprises: defining a predetermined application specification; extracting the community among plural motion compensation algorithms corresponding to plural video compression standards; analyzing the computation of the plural motion compensation algorithms basing on the community, thereby determining the computation elements included in a processing element; analyzing the data flow of the reconfigurable motion compensation architecture basing on the predetermined application specification, both in the cases of peak computation and worst data configuration, while executing the plural motion compensation algorithms with different data granularities and different number of the processing elements, thereby obtaining plural hardware parameters corresponding to the plural motion compensation algorithms; and selecting a predetermined data granularity and a predetermined number of the processing elements of the reconfigurable motion compensation architecture, basing on a predetermined design target and the plural hardware parameters previously obtained.

9 Claims, 3 Drawing Sheets

SPACE EXPLORATION METHOD OF RECONFIGURABLE MOTION COMPENSATION ARCHITECTURE

BACKGROUND OF THE INVENTION

1. Field of the Invention

The present invention relates to a design space exploration method of a reconfigurable motion compensation architecture and, more particularly, to the design space exploration method adapting the concept of collaborative design with configuration/algorithm, for developing a reconfigurable motion compensation architecture.

2. Description of Related Art

With the rapid developing of the multimedia technology, lots of video compression standards, such as MPEG-1, MPEG-2, and MPEG-4 defined by the ISO/IEC, and H.263 and H.264 defined by the ITU-T, has been proposed successively, so as to improve the multimedia experience of the consumers in their daily life.

However, in recent years, in response to the application of above-mentioned video compression standards, it is a trend to develop a video decode capable of supporting multiple video compression standards. Among these video compression standards, the motion compensation processing is the most import and the core portion. For a video decoder, the motion compensation processing includes: finding a corresponding block in a reference picture, which is most similar to the current picture, based on the motion vector obtained from the motion estimation process, and thus obtaining a motion compensation estimation value through an interpolation computation.

Since there are some common parts between the motion compensation processes respectively corresponding to these video compression standards, a certain portion of the hardware resource will be consumed during the processing on these common parts, especially when the decoder can support these video compression standards.

Therefore, a design method of a reconfigurable motion compensation architecture is required, for developing an efficient reconfigurable motion compensation architecture based on the required application specification, in order to support the motion compensation process corresponding to different video compression standards.

SUMMARY OF THE INVENTION

The present invention provides a design space exploration method of a reconfigurable motion compensation architecture, adapting the concept of collaborative design with configuration/algorithm for developing a reconfigurable motion compensation architecture.

The design space exploration method of a reconfigurable motion compensation architecture of the present invention, comprises: defining a predetermined application specification; extracting at least one community among a plurality of motion compensation algorithms respectively corresponding to a plurality of video compression standards; analyzing the computation of each of the plurality of motion compensation algorithms basing on the community, thereby determining the computation elements included in a processing element; analyzing the data flow of the reconfigurable motion compensation architecture basing on the predetermined application specification, both in the case of peak computation and in the case of worst data configuration, while executing each of the plurality of motion compensation algorithms with different data granularities and with different number of the processing elements, thereby obtaining a plurality of hardware parameters corresponding to each of the plurality of motion compensation algorithms; and selecting a predetermined data granularity and a predetermined number of the processing elements of the reconfigurable motion compensation architecture, basing on a predetermined design target and the plurality of hardware parameters corresponding to each of the plurality of motion compensation algorithms.

According to one embodiment of the present invention, the design space exploration method of a reconfigurable motion compensation architecture further comprises: analyzing the reusable data in a reference block corresponding to each of the plurality of block partitioning types while processing each of the plurality of block partitioning types with different data granularities, basing on the plurality of block partitioning types supported by each of the plurality of motion compensation algorithms, thereby obtaining the plurality of hardware parameters corresponding to each of the plurality of motion compensation algorithms, wherein, as the reconfigurable motion compensation architecture is processed in the predetermined data granularity, the reusable data in the reference block is stored in an internal memory of the reconfigurable motion compensation architecture.

According to one embodiment of the present invention, the design space exploration method of a reconfigurable motion compensation architecture further comprises: analyzing a reference block corresponding to each of a plurality of pixel interpolation types basing on the plurality of pixel interpolation types supported by each of the plurality of motion compensation algorithms, thereby obtaining the plurality of hardware parameters corresponding to each of the plurality of motion compensation algorithms, wherein, as the reconfigurable motion compensation architecture is processed in the predetermined data granularity, the reference block corresponding to the plurality of pixel interpolation types is extracted from an internal memory of the reconfigurable motion compensation architecture.

As described above, the design space exploration method of a reconfigurable motion compensation architecture of the present invention analyzed the computation of each of the plurality of motion compensation algorithms, based on the community between the motion compensation algorithms corresponding to different kinds of video compression standards. Thus, the number of the processing elements of the reconfigurable motion compensation architecture can be obtained, and the hardware resources can be saved. In addition, the design space exploration method of a reconfigurable motion compensation architecture of the present invention analyzes the data flow of the reconfigurable motion compensation architecture while executing each of the plurality of motion compensation algorithms with different data granularities and with different number of the processing elements, and obtains the hardware parameter corresponding to each of the plurality of motion compensation algorithms. Then, based on the predetermined design target and the plurality of hardware parameters, the design space exploration method of a reconfigurable motion compensation architecture of the present invention selects the predetermined data granularity and the predetermined number of the processing elements, in order to develop a reconfigurable motion compensation architecture not only meeting the predetermined application specification, but also having better efficiency.

DETAILED DESCRIPTION OF THE PREFERRED EMBODIMENT

Figure 1:
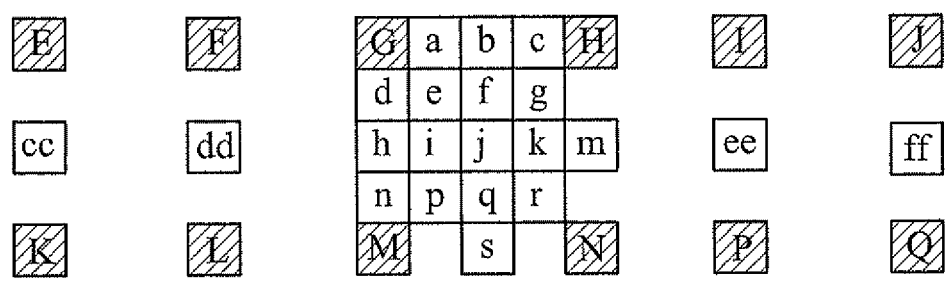
FIG. 1 is a perspective view illustrating the interpolation of non-integer-point pixel, which is supported by the video compression standard H.264.

As various kinds video compression standards has defined different profiles and different levels, respectively, to meet different kinds of application requirement, the first step of the design space exploration method of a reconfigurable motion compensation architecture of the present invention is to define a predetermined application specification, and develop an efficient reconfigurable motion compensation architecture in the predetermined application specification, through the design space exploration method.

The table 1 is the table listing the predetermined application specification, which is supported by the reconfigurable motion compensation architecture according to one embodiment of the present invention. As listed in Table 1, the reconfigurable motion compensation architecture in the present embodiment gives support to a level as high as the main profile of the video compression standard MPEG-2, an L4 level as same as the advanced coding efficiency profile of the video compression standard MPEG-4, an L4 level as same as the main profile of the video compression standard H.264. Besides, the reconfigurable motion compensation architecture in the present embodiment also gives support to P-frames and B-frame processing, and can process 30 frames per second in real time, wherein each of the frames has a YCrCb ratio of 4:2:0 and a high resolution of 1920×1088.

TABLE 1

The predetermined application specification supported by the reconfigurable motion compensation architecture

| | |
|---|---|
| Image Resolution | 1920 × 1088 |
| Color Format (Y:Cr:Cb) | 4:2:0 |
| Frame Rate (frame/sec.) | 30 |
| Picture Type | P-frames and B-frames |
| Profile and level of the MPEG-2 standard | a level as high as main profile |
| Profile and level of the MPEG-4 standard | L4 level as same as advanced coding efficiency profile |
| Profile and level of the H.264 standard | L4 level as same as main profile |

In order to give support to the above video compression standards, the reconfigurable motion compensation architecture in the present embodiment analyzes the difference between those motion compensation algorithms respectively corresponding to these video compression standards, then extracts at least one community among these motion compensation algorithms, enabling the reconfigurable motion compensation architecture to operate more efficiently and save the hardware source.

For example, the motion compensation algorithm corresponding to the H.264 standard can support a luminance interpolation with the precision of ¼-pixel, and a chrominance interpolation with the precision of ⅛-pixel. Besides, the motion compensation algorithm corresponding to the MPEG-4 standard can support a luminance interpolation with the precision of ¼-pixel in the luminance estimation, and a chrominance interpolation with the precision of ½-pixel in the chrominance estimation. In addition, with the luminance interpolation with the precision of ¼–4 standard. However, a sequence of common divisors is existed between the sequence of tap factors applied in the motion compensation algorithm corresponding to the H.264 standard, i.e. [1, 5, 20, 20, −5, 1], and the sequence of tap factors applied in the motion compensation algorithm corresponding to the MPEG-4 pixel, a 6-tap finite impulse response filter is used in the motion compensation algorithm corresponding to the H.264 standard, while a 8-tap finite impulse response filter is used in the motion compensation algorithm corresponding to the MPEG-standard, i.e. [−8, 24, −48, 160, 160, −48, 24, −8]. By executing one or more simple addition operation and one or more shift operation, the above sequences of tap factors can be obtained from the sequence of common divisors.

By dividing the sequence of tap factors applied in the motion compensation algorithm corresponding to the MPEG-4 standard, i.e. [−8, 24, −48, 160, 160, −48, 24, −8] with a divisor of 8, a sequence of tap factors of [−1, 3, −6, 20, 20, −6, 3, −1] can be obtained. Both of the sequence of tap factors of [−1, 3, −6, 20, 20, −6, 3, −1], and the sequence of tap factors applied in the motion compensation algorithm corresponding to the H.264 standard, i.e. [1, 5, 20, 20, −5, 1], can be obtained from the sequence of common divisors [1, 2, 4, 16], through the addition operations and shift operations listed in the below Table 2. The tap factor 3 can be obtained by the shift operation of shifting the tap factor 1 to the left with 1 bit (obtaining the tap factor 2), and the addition operation of adding 1 to the tap factor. The tap factor −5 can be obtained by the shift operation of shifting the tap factor 1 to the left with 2 bits (obtaining the tap factor 4), and the addition operation of adding 1 to the tap factor. The tap factor −6 can be obtained by the shift operation of shifting the tap factor 1 to the left with 2 bits (obtaining the tap factor 4), and the addition operation of adding 2 to the tap factor. The tap factor 3 can be obtained by the shift operation of shifting the tap factor 1 to the left with 4 bits and the addition operation of adding 4 to the tap factor. Besides, since both the motion compensation algorithms corresponding to the MPEG-2 standard and the MPEG-4 standard can support a luminance interpolation with the precision of ½-pixel, and a chrominance interpolation with the precision of ½-pixel, a simple bi-linear filter can be used to generate one or more estimations of the motion compensation.

TABLE 2

The operation of the tap factors

| Tap Factor | Operation |
|---|---|
| 20 | 16 + 4 |
| −6 | 4 + 2 |
| −5 | 4 + 1 |
| 3 | 2 + 1 |

Then, the design space exploration method of a reconfigurable motion compensation architecture of the present invention analyzes the computation of each of the motion compensation algorithms respectively corresponding to these video compression standards, based on the community described above. Then, the design space exploration method of a reconfigurable motion compensation architecture of the present invention determines the computation elements included in a processing element of the reconfigurable motion compensation architecture. FIG. 1 is a perspective view illustrating the interpolation of non-integer-point pixel, which is supported by the video compression standard H.264. As shown in FIG. 1, in the motion compensation algorithms corresponding to the video compression standard H.264, a ½-pixel position is interpolated with a total of 6 nearby integer-pixel points. For example, a ½-pixel position b=round ((E−5F+20G+20H−5I+J)/32), where the round ( ) represents a round operation. Based on the community extracted above, in the motion compensation algorithms corresponding to the video compression standard H.264, the ½-pixel position [(G+J)(16+4)+(F+J)((−4)+(−1))+(E+J)+16]>>5. Thus, the tap factor at the ½-pixel position b can be obtained by executing 8 addition operations and 1 shift operation. At this stage, only the computation required to obtain each of the plurality of pixel positions, in the motion compensation algorithm corresponding to the video compression standard H.264 and based on the sequence of common divisors, is analyzed. That is, the addition operation and the shift operation required in obtaining the sequence of the tap factors, from the sequence of common divisors is not included. In same manner, basing on the sequence of common divisors described above, the computation required to obtain each of the plurality of pixel positions in the motion compensation algorithms corresponding to the video compression standard MPEG-2 and the video compression standard MPEG-4 can also be analyzed.

Please refer to FIG. 1, the motion compensation algorithm corresponding to the video compression standard H.264 can support a plurality of block partitioning types, including the 4×4, 8×4, 8×8, and 16×8 block partitioning types. While in the case of the motion compensation algorithm corresponding to the video compression standard H.264 processing the pixel position I, f, k, or q of the 4×4 block partitioning type, due to the poor reusability of the interpolation values obtained by the computation, and the large computation at the pixel position I, f, k, or q. the case is deemed as the worst case. Besides, the case of the motion compensation algorithm corresponding to the video compression standard MPEG-4 processing the pixel position a, b, c, or d of the 8×8 block partitioning type is deemed as the worst case. In addition, the case of the motion compensation algorithm corresponding to the video compression standard MPEG-2 processing the pixel position a of the 16×16 block partitioning type is deemed as the worst case.

Therefore, the design space exploration method of a reconfigurable motion compensation architecture of the present invention can analyze the computation of each of the motion compensation algorithms respectively corresponding to these video compression standards, while processing the luminance interpolation and the chrominance interpolation of a P-frame and the luminance interpolation and the chrominance interpolation of a B-frame in a worst case. Taking the addition operation as an example, since in the worst case, more addition operations are required in obtaining the first pixel position through the interpolation in the motion compensation algorithm corresponding to the video compression standard MPEG-4, compared with the other two motion compensation algorithms respectively corresponding to the other two video compression standards. Thus, if an enough number of addition operations are included in a processing element, the motion compensation algorithm corresponding to the video compression standard MPEG-4 can still process in a clock cycle, even in the worst case.

In order to develop the reconfigurable motion compensation architecture, the design space exploration method of a reconfigurable motion compensation architecture of the present invention adapts the multiple abstract layers of the top-to-down design methodology, such as an application specification layer, an algorithm layer, and a configuration layer. The design space exploration method first analyzes the data flow of each of the plurality of motion compensation algorithms at the top layer, and then explores each of the plurality of design restraints on by one, in order to obtain the hardware suitable for the predetermined design target.

For the reconfigurable motion compensation architecture, the data flow of the top layer includes the extraction of the required data and the computation of the data in a unit clock cycle. In the present embodiment, the design space exploration method analyzes the data flow of the reconfigurable motion compensation architecture basing on the predetermined application specification, both in the case of peak computation and in the case of worst data configuration, while executing each of the plurality of motion compensation algorithms with different data granularities and with different number of the processing elements. Thereby, the design space exploration method obtains a plurality of hardware parameters corresponding to each of the plurality of motion compensation algorithms. For example, peak bandwidth, number of bits of a bus, required memory capacity, and operating frequency, etc.

For example, since the minimum block partitioning type, which the motion compensation algorithm corresponding to the video compression standard H.264 can support, is 4×4 block partitioning type, thus the above-mentioned analysis can be perform on the basis of the 4×4 block partitioning type. That is, the data flow of the computation, while executing each of the plurality of motion compensation algorithms with the data granularity of the 4×4 block partitioning type, is respectively analyzed with different number of the processing elements.

The following tables, i.e. Table 3, Table 4, and Table 5, are the tables listing the estimated operating frequencies with different number of the processing elements in the MPEG-2 standard, in the MPEG-4 standard, and in the H.264 standard, respectively. In these tables, the I indicates an I-frame, the B indicates a B-frame, and the P indicates a P-frame.

TABLE 3

The estimated operating frequencies with different number of the processing elements in the MPEG-2 standard

| Number of the Processing Elements | Estimated Operating Frequencies of Different Group of Picture Configuration | | | |
|---|---|---|---|---|
| | IP | IBP | IBBP | IBBBP |
| 1 | 94 MHz | 141 MHz | 156 MHz | 162 MHz |
| 2 | 47 MHz | 70 MHz | 78 MHz | 81 MHz |
| 3 | 31 MHz | 37 MHz | 45 MHz | 49 MHz |
| 4 | 23 MHz | 35 MHz | 39 MHz | 40 MHz |
| 5 | 18 MHz | 28 MHz | 31 MHz | 32 MHz |

TABLE 4

The estimated operating frequencies with different number of the processing elements in the MPEG-4 standard

| Number of the Processing Elements | Estimated Operating Frequencies of Different Group of Picture Configuration | | | |
|---|---|---|---|---|
| | IP | IBP | IBBP | IBBBP |
| 1 | 211 MHz | 308 MHz | 341 MHz | 354 MHz |
| 2 | 105 MHz | 154 MHz | 170 MHz | 177 MHz |

TABLE 4-continued

The estimated operating frequencies with different number of the processing elements in the MPEG-4 standard

| Number of the Processing Elements | Estimated Operating Frequencies of Different Group of Picture Configuration | | | |
|---|---|---|---|---|
| | IP | IBP | IBBP | IBBBP |
| 3 | 70 MHz | 102 MHz | 113 MHz | 118 MHz |
| 4 | 52 MHz | 77 MHz | 85 MHz | 88 MHz |
| 5 | 42 MHz | 61 MHz | 68 MHz | 70 MHz |

TABLE 5

The estimated operating frequencies with different number of the processing elements in the H.264 standard

| Number of the Processing Elements | Estimated Operating Frequencies of Different Group of Picture Configuration | | | |
|---|---|---|---|---|
| | IP | IBP | IBBP | IBBBP |
| 1 | 2611 MHz | 370 MHz | 406 MHz | 421 MHz |
| 2 | 130 MHz | 185 MHz | 203 MHz | 210 MHz |
| 3 | 87 MHz | 123 MHz | 135 MHz | 140 MHz |
| 4 | 65 MHz | 92 MHz | 101 MHz | 105 MHz |
| 5 | 52 MHz | 74 MHz | 81 MHz | 84 MHz |

As shown in the above tables, i.e., Tables 3, Table 4, and Table 5, when 1 or 2 processing element(s) is applied, the reconfigurable motion compensation architectures, which give support to the video compression standard MPEG-4 and the video compression standard H.264, both have higher operating frequency. Therefore, too much hardware resource may be consumed in the implementation of the above higher operating frequencies. When 3 processing elements is applied, the regularity of the data flow of the reconfigurable motion compensation architectures, which give support to the above 3 video compression standards, is low and the complexity thereof is high. However, although when 5 processing elements being applied, the operating frequency of the reconfigurable motion compensation architectures can be lower, but the problems, similar to those raised in the 3 processing elements case, still occurs. As a result, in the present embodiment, a predetermined data granularity (4×4) and a predetermined number (4) of the processing elements of the reconfigurable motion compensation architecture can be selected, based on a predetermined design target and the plurality of hardware parameters corresponding to each of the plurality of motion compensation algorithms. In this case, the predetermined design target may be the most suitable operating frequency, bandwidth, and the required memory capacity in the predetermined data granularity and the predetermined number of the processing elements, obtained after reviewing the hardware parameters corresponding to each of the plurality of motion compensation algorithms.

It should be notice that, in the above tables, i.e., Tables 3, Table 4, and Table 5, the data flow is obtained from the exploration the reconfigurable motion compensation architecture with different design restraints, based on the community extracted and the predetermined application specification. Thus, the hardware parameters corresponding to each of the plurality of motion compensation algorithms are obtained. However, the community will be varied with different kinds of video compression standards to be supported. Moreover, the data granularity and the number of the processing elements, meeting the requirements of the design target, will be varied with the different definition of the application specification. The design space exploration method of a reconfigurable motion compensation architecture described above can be used for developing the hardware meeting the application specification more efficiently.

Figure 2:
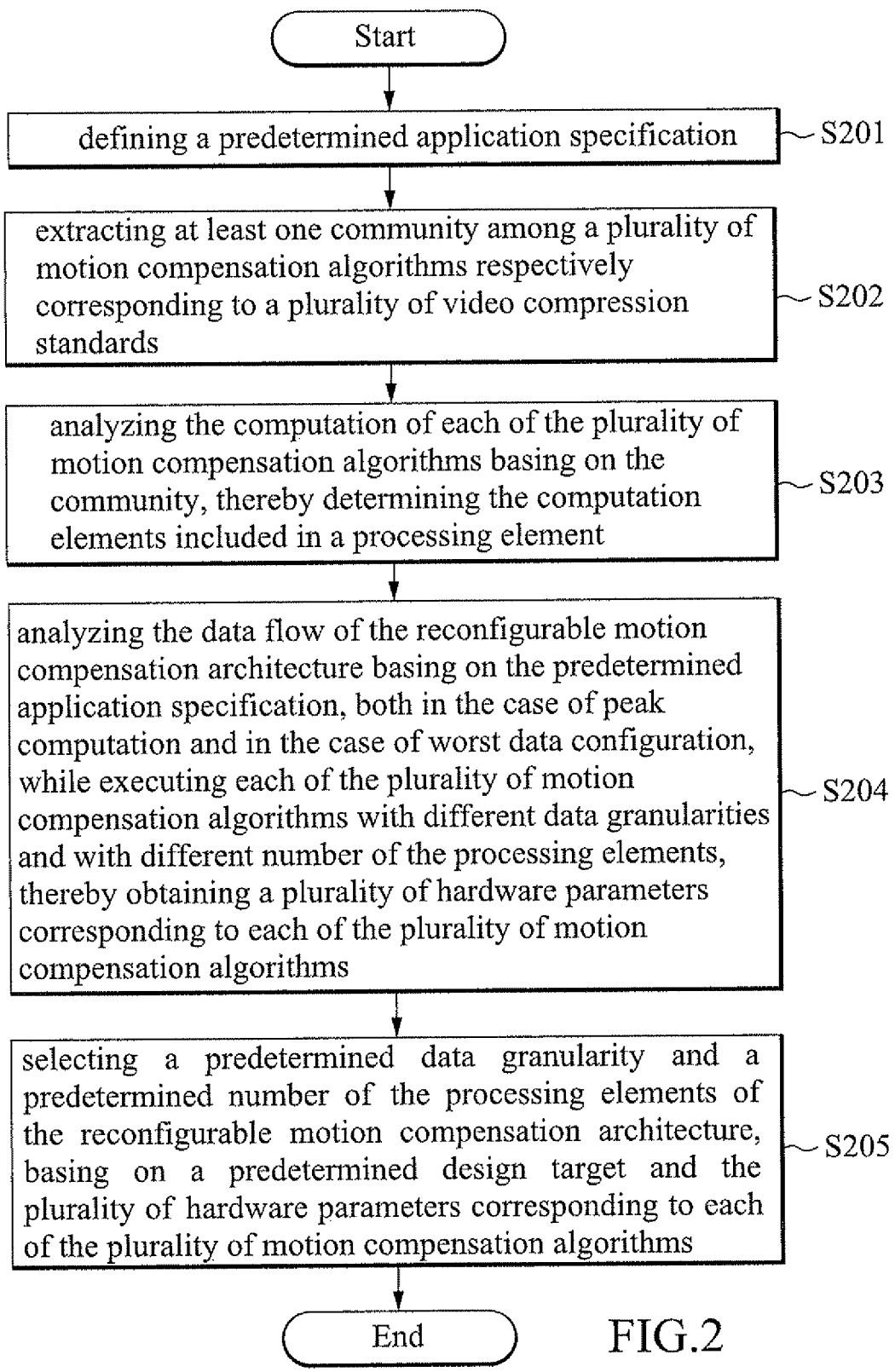
FIG. 2 is a flowchart illustrating the design space exploration method of a reconfigurable motion compensation architecture, according to one embodiment of the present invention.

As shown in FIG. 2, which is a flowchart illustrating the design space exploration method of a reconfigurable motion compensation architecture, according to one embodiment of the present invention. The method comprises the steps of: defining a predetermined application specification (step S201); extracting at least one community among a plurality of motion compensation algorithms respectively corresponding to a plurality of video compression standards (step S202); analyzing the computation of each of the plurality of motion compensation algorithms basing on the community, thereby determining the computation elements included in a processing element (step S203); analyzing the data flow of the reconfigurable motion compensation architecture basing on the predetermined application specification, both in the case of peak computation and in the case of worst data configuration, while executing each of the plurality of motion compensation algorithms with different data granularities and with different number of the processing elements, thereby obtaining a plurality of hardware parameters corresponding to each of the plurality of motion compensation algorithms (step S204); and selecting a predetermined data granularity and a predetermined number of the processing elements of the reconfigurable motion compensation architecture, basing on a predetermined design target and the plurality of hardware parameters corresponding to each of the plurality of motion compensation algorithms (step S205).

Figure 3:
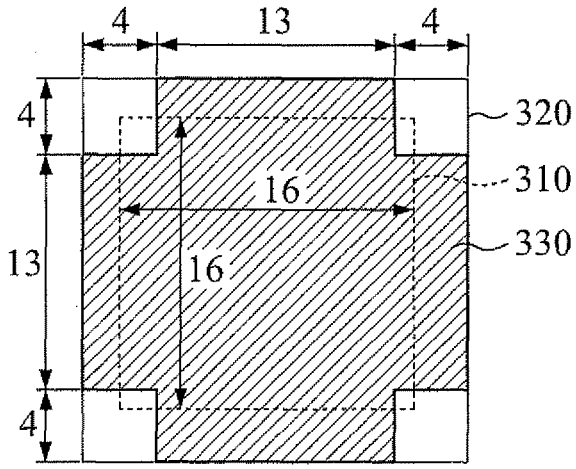
FIG. 3 is a perspective view illustrating the reference block required by the motion compensation algorithm corresponding to the video compression standard H.264, based on a 16×16 block partitioning type.

Further, in the design space exploration method of a reconfigurable motion compensation architecture, other design strategy can be applied for improving the operating efficiency of the reconfigurable motion compensation architecture. In other embodiment of the present invention, the design space exploration method of a reconfigurable motion compensation architecture analyzes the reusable data in a reference block corresponding to each of the plurality of block partitioning types, while processing each of the plurality of block partitioning types with different data granularities and basing on the plurality of block partitioning types supported by each of the plurality of motion compensation algorithms. FIG. 3 is a perspective view illustrating the reference block required by the motion compensation algorithm corresponding to the video compression standard H.264, based on a 16×16 block partitioning type. As shown in FIG. 3, when the motion compensation algorithm corresponding to the video compression standard H.264 according to one embodiment of the present invention is processing, based on the 16×16 block partitioning type 310, a 21×21 reference block 320 is required for the computation of the intra-pixel interpolation of the 16×16 block partitioning type 310.

If the reconfigurable motion compensation architecture completes the 16 pixel interpolations included in the 16×16 block partitioning type 310 with the 4×4 data granularity one by one, the 21×21 reference block 320 has a reusable data indicated as the shaded area 330. The usable data in a reference block corresponding to different block partitioning types will be varied with different data granularity. The design strategy adapted in the present embodiment is to store the reusable data in an internal memory, for the processing of the next block, thereby reducing the bandwidth loading caused by accessing the data from an exterior memory. Through the analysis, the hardware parameters respectively corresponding to each of the plurality motion compensation algorithms can be obtained, such as the internal memory capacity and the bandwidth. Then, based on the design target and these hardware parameters, a most suitable predetermined data granularity of the reconfigurable motion compensation architecture can be selected.

Moreover, in the other embodiment of the present invention, the design space exploration method of a reconfigurable motion compensation architecture analyzes a reference block corresponding to each of a plurality of pixel interpolation types. For example, in the video compression standard MPEG-2, an M×N reference block is required in the computation of the luminance interpolation and the chrominance interpolation of an integer-point pixel. Besides, a (M+1)×N reference block is required in the computation of the luminance interpolation and the chrominance interpolation of a horizontal ½-pixel. Here, M×N represents the size of the block partitioning type. In same manner, reference blocks having different size are extracted, in different pixel interpolation types of the video compression standard MPEG-4 and the video compression standard H.264. The design strategy adapted in the present embodiment is to store the reference block in an internal memory, which is extracted basing on the pixel interpolation type during the processing of the reconfigurable motion compensation architecture, thereby reducing the bandwidth loading caused by accessing the data from an exterior memory. Through the analysis, the hardware parameters respectively corresponding to each of the plurality motion compensation algorithms can be obtained, such as the bandwidth. Then, based on the design target and these hardware parameters, a most suitable predetermined data granularity of the reconfigurable motion compensation architecture can be selected.

Figure 4:
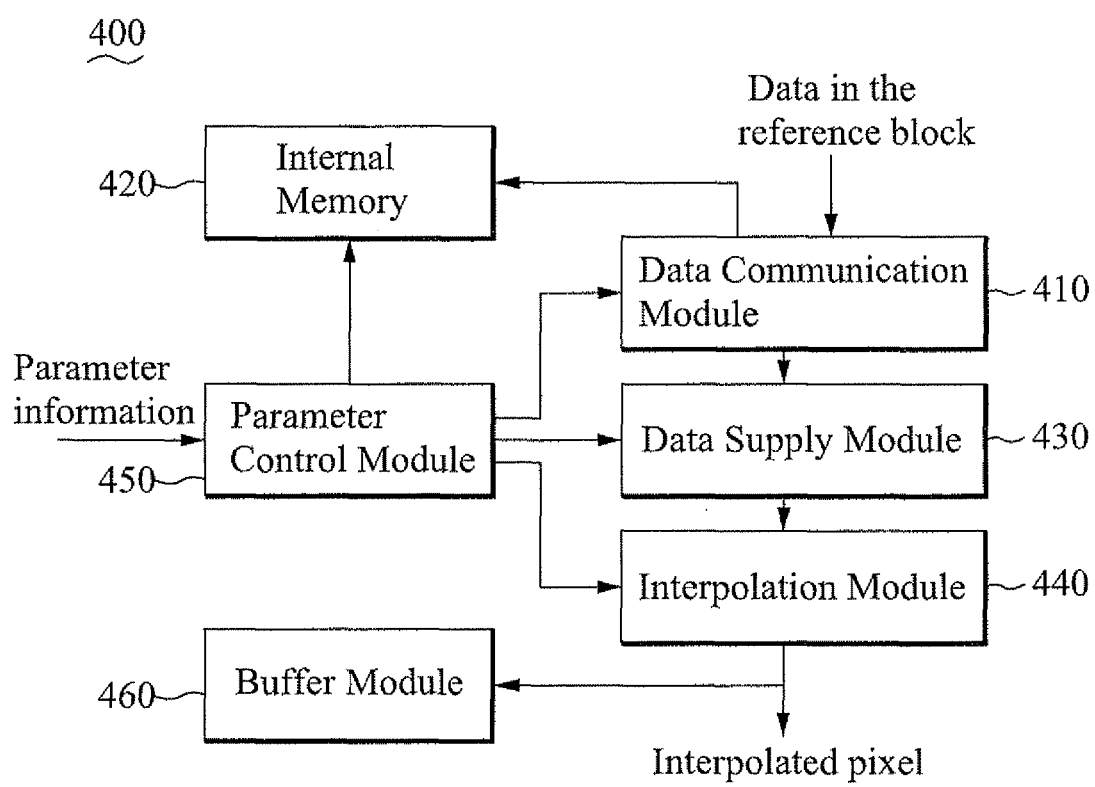
FIG. 4 is a perspective view illustrating the reconfigurable motion compensation architecture according to one embodiment of the present invention.

Through the design space exploration method and the design strategy described above, a most suitable reconfigurable motion compensation architecture meeting the predetermined application specification, can thus be developed. FIG. 4 is a perspective view illustrating the reconfigurable motion compensation architecture according to one embodiment of the present invention. Please refer to FIG. 4, with the design strategy of: the data is reusable data and/or extracting the reference block required based on the pixel interpolation type, the reconfigurable motion compensation architecture 400 of the present embodiment provides a data communication module 410, for extracting the reference block corresponding to each of the plurality of block partitioning types from an exterior memory to a internal memory 420. Moreover, in response to the variation of the pixel interpolation type, different kinds reference block is extracted in the internal memory 420.

Then, when the reconfigurable motion compensation architecture 400 executes the computation of the pixel interpolation, the data communication module 410 will obtained the required data from the internal memory 420 with the predetermined data granularity, and store the reusable data back to the internal memory 420 for the processing of the next block. Since the computation of the pixel interpolation may reference to the pixels in the horizontal direction or in the vertical direction, the reconfigurable motion compensation architecture 400 of the present embodiment provides a data supply module 430, for sequencing the data accessed by the data communication module 410. Through the design space exploration method described above, the number of the processing elements of the reconfigurable motion compensation architecture 400, capable of supporting a plurality of video compression standards, is thus determined. An interpolation module 440, which is formed with a predetermined number of the processing elements, is provided. The interpolation module 440 is used to execute each of the plurality of the motion compensation algorithms. For controlling the cooperation between these modules, the reconfigurable motion compensation architecture 400 of the present embodiment provides a parameter control module 450, for receiving parameters required for executing the plurality of the motion compensation algorithms, such as moving vectors, and then controlling the internal memory 420, the data communication module 410, the data supply module 430, and the interpolation module 440. In addition, the buffer module 460 is used to stored data temporarily.

As described above, the design space exploration method of a reconfigurable motion compensation architecture of the present invention analyzed the computation of each of the plurality of motion compensation algorithms, based on the community between the motion compensation algorithms corresponding to different kinds of video compression standards. Thus, the number of the processing elements of the reconfigurable motion compensation architecture can be obtained, and the hardware resources can be saved. In addition, the design space exploration method of a reconfigurable motion compensation architecture of the present invention analyzes the data flow of the reconfigurable motion compensation architecture while executing each of the plurality of motion compensation algorithms with different data granularities and with different number of the processing elements, and obtains the hardware parameter corresponding to each of the plurality of motion compensation algorithms. Then, based on the predetermined design target and the plurality of hardware parameters, the design space exploration method of a reconfigurable motion compensation architecture of the present invention selects the predetermined data granularity and the predetermined number of the processing elements, for developing a reconfigurable motion compensation architecture having better efficiency.

Although the present invention has been explained in relation to its preferred embodiment, it is to be understood that many other possible modifications and variations can be made without departing from the spirit and scope of the invention as hereinafter claimed.

What is claimed is:
1. A design space exploration method of a reconfigurable motion compensation architecture, comprising:
   defining a predetermined application specification;
   extracting at least one community among a plurality of motion compensation algorithms respectively corresponding to a plurality of video compression standards;
   analyzing the computation of each of the plurality of motion compensation algorithms basing on the community, thereby determining the computation elements included in a processing element;
   analyzing the data flow of the reconfigurable motion compensation architecture basing on the predetermined application specification, both in the case of peak computation and in the case of worst data configuration, while executing each of the plurality of motion compensation algorithms with different data granularities and with different number of the processing elements, thereby obtaining a plurality of hardware parameters corresponding to each of the plurality of motion compensation algorithms; and
   selecting a predetermined data granularity and a predetermined number of the processing elements of the reconfigurable motion compensation architecture, basing on a predetermined design target and the plurality of hardware parameters corresponding to each of the plurality of motion compensation algorithms.

2. The design space exploration method of a reconfigurable motion compensation architecture as claimed in claim 1, further comprising:
 analyzing the reusable data in a reference block corresponding to each of the plurality of block partitioning types while processing each of the plurality of block partitioning types with different data granularities, basing on the plurality of block partitioning types supported by each of the plurality of motion compensation algorithms, thereby obtaining the plurality of hardware parameters corresponding to each of the plurality of motion compensation algorithms, wherein, as the reconfigurable motion compensation architecture is processed in the predetermined data granularity, the reusable data in the reference block is stored in an internal memory of the reconfigurable motion compensation architecture.

3. The design space exploration method of a reconfigurable motion compensation architecture as claimed in claim 2, further comprising:
 providing a data communication module in the reconfigurable motion compensation architecture, extracting the reference block corresponding to each of the plurality of block partitioning types in the internal memory, and accessing the required data from the internal memory;
 providing a data supply module in the reconfigurable motion compensation architecture, for sequencing the data accessed by the data communication module; and
 providing an interpolation module in the reconfigurable motion compensation architecture, for receiving the data sequenced by the data supply module for processing, wherein the interpolation module is formed with the predetermined number of the processing elements, in order to execute each of the plurality of the motion compensation algorithms.

4. The design space exploration method of a reconfigurable motion compensation architecture as claimed in claim 2, further comprising:
 providing a parameter control module in the reconfigurable motion compensation architecture, for receiving parameters required for executing the plurality of the motion compensation algorithms, thereby controlling the internal memory, the data communication module, the data supply module, and the interpolation module.

5. The design space exploration method of a reconfigurable motion compensation architecture as claimed in claim 1, further comprising:
 analyzing a reference block corresponding to each of a plurality of pixel interpolation types basing on the plurality of pixel interpolation types supported by each of the plurality of motion compensation algorithms, thereby obtaining the plurality of hardware parameters corresponding to each of the plurality of motion compensation algorithms, wherein, as the reconfigurable motion compensation architecture is processed in the predetermined data granularity, the reference block corresponding to the plurality of pixel interpolation types is extracted from an internal memory of the reconfigurable motion compensation architecture.

6. The design space exploration method of a reconfigurable motion compensation architecture as claimed in claim 5, further comprising:
 providing a data communication module in the reconfigurable motion compensation architecture, extracting the reference block corresponding to each of the plurality of pixel interpolation types in the internal memory, and accessing the required data from the internal memory;
 providing a data supply module in the reconfigurable motion compensation architecture, for sequencing the data accessed by the data communication module; and
 providing an interpolation module in the reconfigurable motion compensation architecture, for receiving the data sequenced by the data supply module for processing, wherein the interpolation module is formed with the predetermined number of the processing elements, in order to execute each of the plurality of the motion compensation algorithms.

7. The design space exploration method of a reconfigurable motion compensation architecture as claimed in claim 6, further comprising:
 providing a parameter control module in the reconfigurable motion compensation architecture, for receiving parameters required for executing the plurality of the motion compensation algorithms, thereby controlling the internal memory, the data communication module, the data supply module, and the interpolation module.

8. The design space exploration method of a reconfigurable motion compensation architecture as claimed in claim 1, wherein the community includes a sequence of common divisors obtained from a plurality of sequence of tap factors, which is used the simplification of the plurality of motion compensation algorithms applying the addition operation and the shift operation.

9. The design space exploration method of a reconfigurable motion compensation architecture as claimed in claim 1, wherein the plurality of hardware parameters comprises peak bandwidth, number of bits of a bus, required memory capacity, and operating frequency.

* * * * *